United States Patent
Chen et al.

(10) Patent No.: US 8,780,261 B2
(45) Date of Patent: Jul. 15, 2014

(54) LIGHT SENSITIVITY CALIBRATION METHOD AND AN IMAGING DEVICE

(75) Inventors: Tai-Hung Chen, New Taipei (TW); Yi-Wen Tsai, New Taipei (TW); Yijian Lee, Taipei (TW)

(73) Assignee: Ability Enterprise, Co., Ltd., Taipei (TW)

( * ) Notice: Subject to any disclaimer, the term of this patent is extended or adjusted under 35 U.S.C. 154(b) by 301 days.

(21) Appl. No.: 13/210,859

(22) Filed: Aug. 16, 2011

(65) Prior Publication Data

US 2012/0206621 A1      Aug. 16, 2012

(30) Foreign Application Priority Data

Feb. 15, 2011   (TW) ................................ 100104875

(51) Int. Cl.
*H04N 5/235* (2006.01)
*G03B 7/00* (2014.01)
*H04N 5/238* (2006.01)

(52) U.S. Cl.
USPC .......................................... 348/362; 348/364

(58) Field of Classification Search
USPC ......................................... 348/362, 364, 366
See application file for complete search history.

(56) References Cited

U.S. PATENT DOCUMENTS

| | | | | |
|---|---|---|---|---|
| 8,115,859 | B2 * | 2/2012 | Kim et al. | 348/364 |
| 2009/0268083 | A1 * | 10/2009 | Arishima et al. | 348/362 |
| 2010/0201847 | A1 * | 8/2010 | Lee | 348/234 |
| 2011/0043647 | A1 * | 2/2011 | Kim et al. | 348/208.4 |
| 2011/0069194 | A1 * | 3/2011 | Okada | 348/222.1 |
| 2011/0293259 | A1 * | 12/2011 | Doepke et al. | 396/236 |
| 2011/0298886 | A1 * | 12/2011 | Price et al. | 348/14.08 |
| 2012/0057073 | A1 * | 3/2012 | Price et al. | 348/364 |
| 2012/0062754 | A1 * | 3/2012 | Huang | 348/208.99 |

FOREIGN PATENT DOCUMENTS

| | | |
|---|---|---|
| CN | 101009760 B | 9/2010 |
| TW | 200740211 A | 10/2007 |
| TW | 201101819 A | 1/2011 |

* cited by examiner

*Primary Examiner* — Kelly L Jerabek
(74) *Attorney, Agent, or Firm* — Rabin & Berdo, P.C.

(57) ABSTRACT

The present invention is directed to a light sensitivity calibration method and an imaging device. An exposure step is performed to obtain a light sensitivity according to a predetermined time. A time adjustment step is performed to adjust the predetermined time according to the light sensitivity, thereby obtaining an adjusted time. The predetermined time is replaced with the adjusted time and the exposure and time adjustment steps are repeatedly performed, until the adjusted time converges within a predetermined range.

18 Claims, 4 Drawing Sheets

LIGHT SENSITIVITY CALIBRATION METHOD AND AN IMAGING DEVICE

BACKGROUND OF THE INVENTION

1. Field of the Invention

The present invention generally relates to an imaging device, and more particularly to a light sensitivity calibration method and system.

2. Description of Related Art

An image sensing element is one of important components of an imaging device, and is used to convert a light signal to an electric signal suitable to be post-processed by a processing unit. However, due to characteristic differences among the image sensing elements, the relationship between the light sensitivity in a preview mode and the light sensitivity in a capture mode generally cannot be maintained constant. Therefore, a need has arisen to calibrate the light sensitivity of preview mode and the light sensitivity of capture mode respectively.

An electronic shutter is ordinarily used to control exposure in the preview mode, and a mechanical shutter is ordinarily used to control exposure in the capture mode. The mechanical shutter has lower accuracy for the reason that a period of time, known as a lag time, is required from the beginning of shutting down the mechanical shutter until the mechanical shutter is completely shut down. As the mechanical shutters are distinct from each other, a need has thus arisen to calibrate the mechanical shutter of each imaging device in order to ensure exposure accuracy.

The calibration procedure for a mechanical shutter should be based on accurate light sensitivity. On the other hand, however, the calibration procedure for light sensitivity should be based on an accurate lag time of the mechanical shutter. In other words, the mechanical shutter calibration and the light sensitivity calibration rely on each other to provide an accurate value as the calibration basis in order to arrive at an accurate calibration result. The conventional calibration procedure for light sensitivity uses a predetermined lag time of the mechanical shutter. As discussed above, the predetermined lag time is usually not consistent with a real mechanical shutter of the imaging device. Accordingly, an accurate result for conventional light sensitivity calibration cannot normally be acquired.

For the foregoing reasons, a need has arisen to propose a novel light sensitivity calibration method used to alleviate the dilemma between the light sensitivity calibration and the mechanical shutter calibration.

SUMMARY OF THE INVENTION

In view of the foregoing, it is an object of the embodiment of the present invention to provide a light sensitivity calibration method and system that give considerations to both the light sensitivity calibration and the mechanical shutter calibration in order to arrive at an accurate calibration value of light sensitivity.

According to the light sensitivity calibration method of the embodiment of the present invention, an exposure step is firstly performed according to a predetermined time, thereby obtaining a light sensitivity. Subsequently, a time adjustment step is performed according to the light sensitivity, thereby adjusting the predetermined time and obtaining an adjusted time. The predetermined time is replaced with the adjusted time, and the exposure step and the time adjustment step are repeatedly performed until the adjusted time converges within a predetermined range.

According to another embodiment, an imaging device includes an image sensing element, an electronic shutter, a mechanical shutter, and an operating center. The image sensing element converts a light signal to a corresponding electric signal. The electronic shutter controls exposure of the image sensing element in the preview mode, and the mechanical shutter controls the exposure of the image sensing element in the capture mode, wherein the mechanical shutter has a lag time. The operating center performs an exposure step according to a predetermined time, thereby obtaining a light sensitivity; performs a time adjustment step according to the light sensitivity, thereby adjusting the predetermined time and obtaining an adjusted time; and replaces the predetermined time with the adjusted time, and repeatedly performs the exposure step and the time adjustment step until the adjusted time converges within a predetermined range.

DETAILED DESCRIPTION OF THE INVENTION

Figure 1:
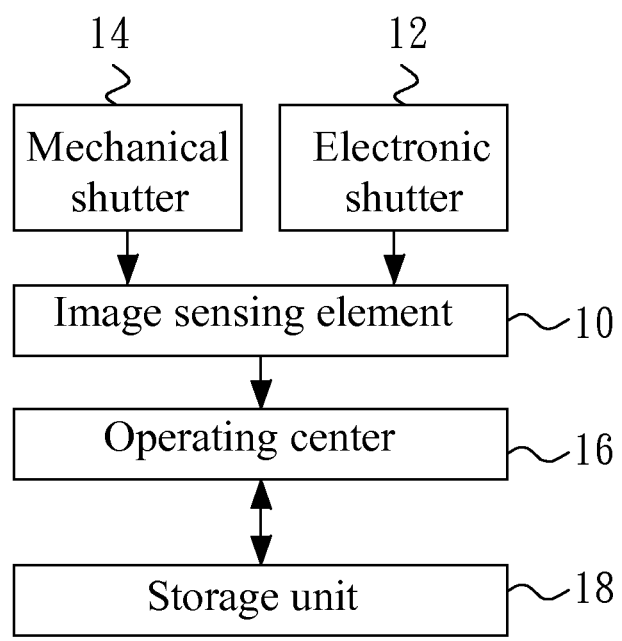
FIG. 1 shows a system block diagram of an imaging device according to one embodiment of the present invention.

FIG. 1 shows a system block diagram of an imaging device according to one embodiment of the present invention. The imaging device may be, but is not limited to, a digital system with image capturing function, such as a digital video camera, a mobile phone, a personal digital assistant, a digital music player, a web camera or an image capturing and testing device.

Referring to FIG. 1, in the embodiment, the imaging device includes an image sensing element 10, an electronic shutter 12, a mechanical shutter 14, an operating center 16, and a storage unit 18. The image sensing element 10 is used to convert a light signal to an electric signal, and may be, but is not limited to, a charge coupled device or a complementary metal oxide semiconductor image sensor. Moreover, the electronic shutter 12 and the mechanical shutter 14 are used to control exposure time of the image sensing element 10. In a practical manner, the electronic shutter 12 is ordinarily used in the preview mode, or is used in both the preview mode and the capture mode; and the mechanical shutter 14 is ordinarily used in the capture mode. Specifically, compared to the electronic shutter 12, as the mechanical shutter 14 is made of mechanical components, it requires a period of time, known as a lag time of the mechanical shutter 14, spanning from the beginning of shutting down the mechanical shutter 14 until the mechanical shutter 14 is completely shut down. During the lag time, as the mechanical shutter 14 has not been completely shut down, some light beams may be falling on the imaging device and may be received by the image sensing element 10.

Still referring to FIG. 1, the operating center 16 receives a capture-mode image in the capture mode or a preview-mode image in the preview mode, and performs light sensitivity calibration for the image sensing element 10 according to a brightness and an exposure time. The operating center 16 may be, but is not limited to, a central processing unit, a digital signal processing unit, or a graphic processing unit; and the storage unit 18 is used to store initial parameters and resultant parameters of the operating center 16. The storage unit 18 may be built in the imaging device or be a removable memory device such as, but not limited to, flash memory.

Figure 2A:
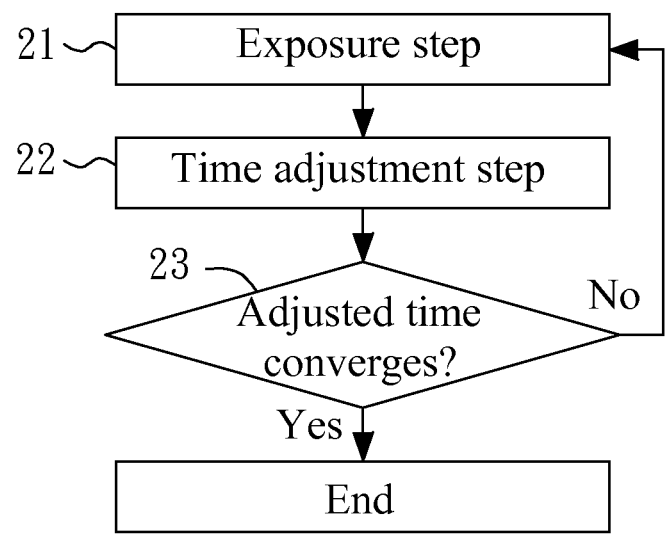
FIG. 2A shows a flow diagram of the light sensitivity calibration method according to one embodiment of the present invention.

FIG. 2A shows a flow diagram of the light sensitivity calibration method according to one embodiment of the present invention. The light sensitivity calibration method may be adapted to the imaging device illustrated in FIG. 1, or may be adapted to another system having an imaging function. Please refer to FIG. 1 and FIG. 2A while the light sensitivity calibration method is described. Firstly, a predetermined time is used as the lag time of the mechanical shutter 14, and the operating center 16 performs an exposure step 21 according to the predetermined time, thereby obtaining a light sensitivity. Specifically, the predetermined time is an estimated initial value of the lag time, and may be pre-stored in the storage unit 18 or manually input by a user. The obtained light sensitivity may be stored in the storage unit 18. The flow of the light sensitivity calibration method according to the embodiment may be performed in the capture mode or the preview mode, and a light sensitivity gain value corresponding to the obtained light sensitivity may, but not necessarily, include a capture-mode light sensitivity gain value and a preview-mode light sensitivity gain value. Subsequently, the operating center 16 performs a time adjustment step 22 according to the light sensitivity obtained in step 21, thereby adjusting the predetermined time and obtaining an adjusted time. The adjusted time may be stored in the storage unit 18. Afterwards, the predetermined time is replaced with the adjusted time obtained in step 22, and the exposure step 21 and the time adjustment step 22 are repeatedly performed, until the adjusted time converges within a predetermined range. Specifically speaking, in the embodiment, the operating center 16 determines the convergence and the convergence means that an absolute difference between a current adjusted time and the predetermined time is less than a predetermined value set by the imaging device or the user. Further, the adjusted time at the convergence is the desired adjusted time.

Figure 2B:
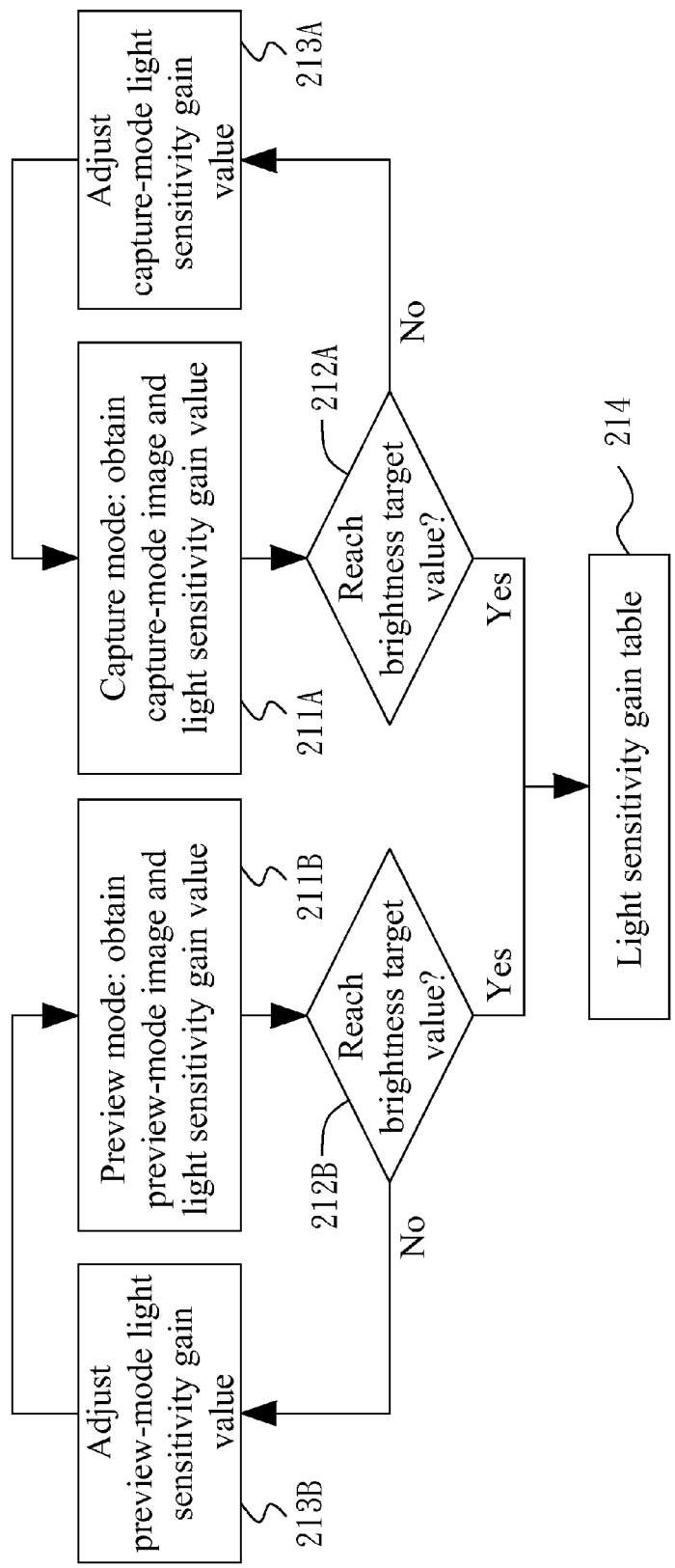
FIG. 2B shows a detailed flow diagram of the exposure step of FIG. 2A.

FIG. 2B shows a detailed flow diagram of the exposure step 21 of FIG. 2A. Referring to FIG. 1, FIG. 2A and FIG. 2B, firstly, the operating center 16 performs an image capture step 211A in the capture mode according to a predetermined light sensitivity and the predetermined time, thereby obtaining a capture-mode image and a capture-mode light sensitivity gain value. Subsequently, in step 212A, it is determined whether the capture-mode image reaches a capture-mode brightness target value. If it is determined that the brightness target value has not been reached, the flow proceeds to step 213A, in which the capture-mode light sensitivity gain value is adjusted, and the image capture step 211A in the capture mode is repeated until it is determined in step 212A that the capture-mode image has reached the capture-mode brightness target value. If it is determined in step 212A that the brightness target value has been reached, the embodiment further includes step 214, in which the corresponding capture-mode light sensitivity gain value is recorded in a light sensitivity gain table.

Still referring to FIG. 1, FIG. 2A, and FIG. 2B, before or after steps 211A-213A in the capture mode, the operating center 16 performs an image capture step 211B in the preview mode according to a predetermined light sensitivity and the predetermined time, thereby obtaining a preview-mode image and a preview-mode light sensitivity gain value. Subsequently, in step 212B, it is determined whether the preview-mode image reaches a preview-mode brightness target value. If it is determined that the brightness target value has not been reached, the flow proceeds to step 213B, in which the preview-mode light sensitivity gain value is adjusted, and the image capture step 211B in the preview mode is repeated until it is determined in step 212B that the preview-mode image has reached the preview-mode brightness target value. If it is determined in step 212B that the brightness target value has been reached, the embodiment further includes step 214, in which the corresponding preview-mode light sensitivity gain value is recorded in the light sensitivity gain table. According to the embodiment, the exposure step 21 is performed respectively in the capture mode and the preview mode, and the operating center 16 constructs the light sensitivity gain table according to the capture-mode light sensitivity gain value obtained in steps 211A-213A in the capture mode and the preview-mode light sensitivity gain value obtained in steps 211B-213B in the preview mode.

Figure 2C:
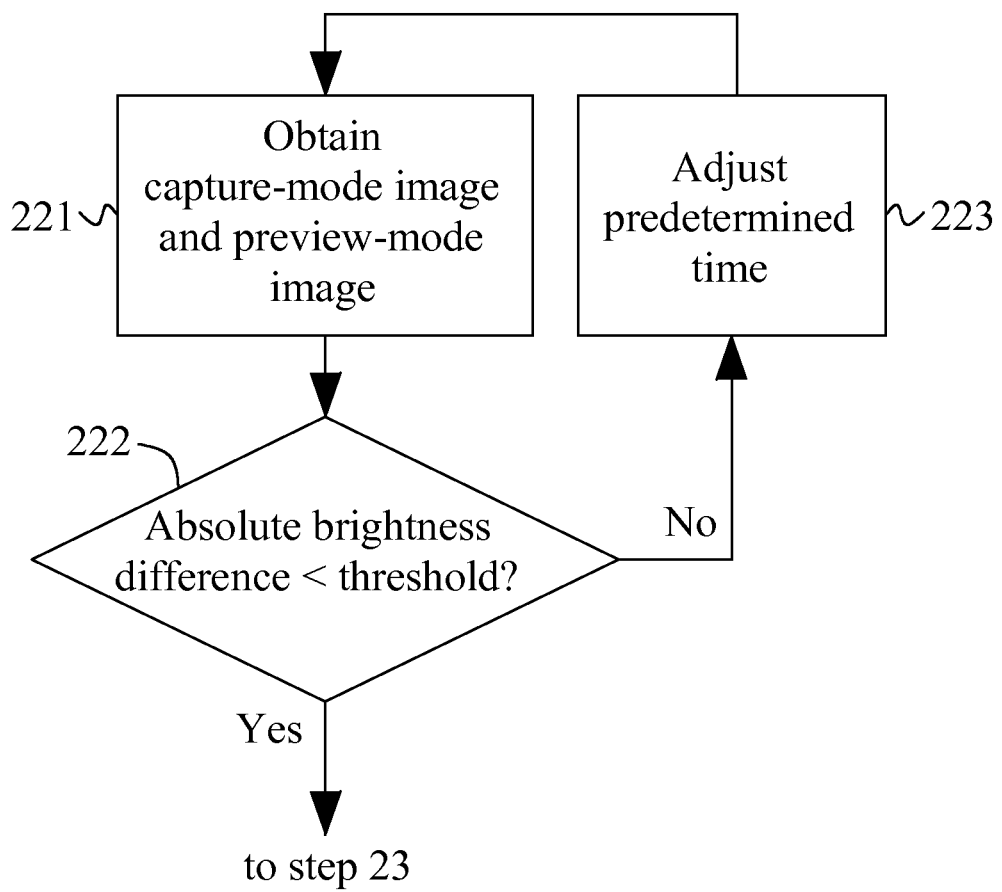
FIG. 2C shows a detailed flow diagram of the time adjustment step of FIG. 2A.

FIG. 2C shows a detailed flow diagram of the time adjustment step 22 of FIG. 2A. Referring to FIG. 1, FIG. 2A, and FIG. 2C, firstly, in step 221, the operating center 16 obtains a capture-mode image and a preview-mode image according to the light sensitivity provided from step 21. Subsequently, in step 222, it is determined whether an absolute brightness difference between the brightness of the capture-mode image and the brightness of the preview-mode image is less than a threshold. If it is determined that the absolute brightness difference is not less than the threshold, the flow proceeds to step 223, in which the lag time of the mechanical shutter 14 is adjusted, followed by repeating step 221. If it is determined in step 222 that the absolute brightness difference is less than the threshold, the current lag time of the mechanical shutter 14 is the desired adjusted time.

Although specific embodiments have been illustrated and described, it will be appreciated by those skilled in the art that various modifications may be made without departing from the scope of the present invention, which is intended to be limited solely by the appended claims.

What is claimed is:

1. A light sensitivity calibration method, comprising:
    performing an exposure step according to a predetermined time, thereby obtaining a light sensitivity;
    performing a time adjustment step according to the light sensitivity, thereby adjusting the predetermined time and obtaining an adjusted time; and
    replacing the predetermined time with the adjusted time, and repeatedly performing the exposure step and the time adjustment step until the adjusted time converges within a predetermined range;
    wherein the predetermined time is a predetermined lag time for shutting down a mechanical shutter.

2. The method of claim 1, wherein the exposure step comprises:
    performing an image capture step of a capture mode according to a predetermined light sensitivity and the predetermined time, thereby obtaining a capture-mode image having a capture-mode light sensitivity gain value; and
    adjusting the capture-mode light sensitivity gain value and repeating the image capture step of the capture mode until the capture-mode image reaches a capture-mode brightness target value.

3. The method of claim 2, further comprising:
    when the capture-mode image reaches the capture-mode brightness target value, recording the capture-mode light sensitivity gain value in a light sensitivity gain table.

4. The method of claim 2, wherein in the image capture step of the capture mode, the mechanical shutter is used to control an exposure time in the exposure step.

5. The method of claim 1, wherein the exposure step comprises:
performing an image capture step of a preview mode according to a predetermined light sensitivity and the predetermined time, thereby obtaining a preview-mode image having a preview-mode light sensitivity gain value; and
adjusting the preview-mode light sensitivity gain value and repeating the image capture step of the preview mode until the preview-mode image reaches a preview-mode brightness target value.

6. The method of claim 5, further comprising:
when the preview-mode image reaches the preview-mode brightness target value, recording the preview-mode light sensitivity gain value in a light sensitivity gain table.

7. The method of claim 5, wherein in the image capture step of the preview mode, an electronic shutter is used to control an exposures time in the exposure step.

8. The method of claim 1, wherein the time adjustment step comprises:
obtaining a capture-mode image and a preview-mode image according to the light sensitivity; and
adjusting the predetermined time and repeatedly obtaining the capture-mode image and the preview-mode image, until the absolute brightness difference between the capture-mode image and the preview-mode image is less than a threshold.

9. The method of claim 1, wherein the adjusted time converges when an absolute difference between the current adjusted time and the predetermined time is less than a predetermined value.

10. An imaging device, comprising:
an image sensing element that converts a light signal to a corresponding electric signal;
a shutter that controls exposure of the image sensing element in a preview mode or a capture mode; and
an operating center that performs an exposure step according to a predetermined time, thereby obtaining a light sensitivity, and that performs a time adjustment step according to the light sensitivity, thereby adjusting the predetermined time and obtaining an adjusted time; and that replaces the predetermined time with the adjusted time, and that repeatedly performs the exposure step and the time adjustment step until the adjusted time converges within a predetermined range;
wherein the predetermined time comprises a predetermined lag time for shutting down a mechanical shutter.

11. The device of claim 10, further comprising a storage unit that stores the predetermined time, the light sensitivity, and the adjusted time.

12. The device of claim 10, wherein the light sensitivity corresponds to a capture-mode light sensitivity gain value or a preview-mode light sensitivity gain value.

13. The device of claim 12, wherein the exposure step comprises:
performing an image capture step of the capture mode according to a predetermined light sensitivity and the predetermined time, thereby obtaining a capture-mode image and the capture-mode light sensitivity gain value;
adjusting the capture-mode light sensitivity gain value and repeating the image capture step of the capture mode until the capture-mode image reaches a capture-mode brightness target value;
performing an image capture step of the preview mode according to the predetermined light sensitivity and the predetermined time, thereby obtaining a preview-mode image and the preview-mode light sensitivity gain value; and
adjusting the preview-mode light sensitivity gain value and repeating the image capture step of the preview mode until the preview-mode image reaches a preview-mode brightness target value.

14. The device of claim 13, wherein the operating center constructs a light sensitivity gain table according to the capture-mode light sensitivity gain value and the preview-mode light sensitivity gain value.

15. The device of claim 10, wherein the time adjustment step comprises:
obtaining a capture-mode image and a preview-mode image according to the light sensitivity; and
adjusting the predetermined time and repeatedly obtaining the capture-mode image and the preview-mode image, until the absolute brightness difference between the capture-mode image and the preview-mode image is less than a threshold.

16. The device of claim 10, wherein the adjusted time is determined by the operating center to be convergent when an absolute difference between the current adjusted time and the predetermined time is less than a predetermined value.

17. The device of claim 10, wherein the shutter comprises an electronic shutter or the mechanical shutter, the electronic shutter controlling the exposure of the image sensing element in the preview mode, and the mechanical shutter controlling the exposure of the image sensing element in the capture mode.

18. The device of claim 10, wherein the imaging device comprises a digital system.

* * * * *